Oct. 14, 1952 A. J. WILLIAMS, JR., ET AL 2,614,188
VIBRATORY TYPE OF SYNCHRONOUS CONVERTER

Filed Jan. 31, 1947 2 SHEETS—SHEET 1

INVENTORS
ALBERT J. WILLIAMS, JR.
RAYMOND E. TARPLEY
BY
Woodcock and Phelan
ATTORNEYS Oct. 14, 1952      A. J. WILLIAMS, JR., ET AL      2,614,188
VIBRATORY TYPE OF SYNCHRONOUS CONVERTER
Filed Jan. 31, 1947      2 SHEETS—SHEET 2

INVENTORS
ALBERT J. WILLIAMS, JR.
RAYMOND E. TARPLEY
BY
Woodcock and Phelan
ATTORNEYS Patented Oct. 14, 1952

2,614,188

UNITED STATES PATENT OFFICE 2,614,188

VIBRATORY TYPE OF SYNCHRONOUS CONVERTER

Albert J. Williams, Jr., and Raymond E. Tarpley, Philadelphia, Pa., assignors to Leeds and Northrup Company, Philadelphia, Pa., a corporation of Pennsylvania Application January 31, 1947, Serial No. 725,465

13 Claims. (Cl. 200—91)

This invention relates to synchronous converters of the vibratory reed type suited for converting unidirectional current or low frequency alternating current to alternating current of synchronous frequency for amplification by alternating current amplifiers, or conversely, for converting alternating current of synchronous frequency to unidirectional current.

In accordance with one aspect of the invention, the driving coil for the reed and the coil leads are shielded from the vibrator contacts and connections thereto to isolate the amplifier from the driving coil circuit and so avoid spurious effects in circuits associated with the contacts. More specifically, the shielding for the coil leads is resilient to permit the assembly of coil, reed and contacts freely to vibrate as a whole with respect to its mounting, thus to avoid transmission of mechanical vibration from the assembly to the associated amplifier tubes or equipment.

In accordance with another aspect of the invention, the external magnetic circuit for the driving coil is extended well beyond the core and the armature of the vibrating reed to minimize stray leakage flux from the gap between the core and armature, so to avoid the disturbing effect of such flux upon the vibrating contacts, and thus minimize spurious signals from this cause.

Further, in accordance with the invention, the vibrator contacts are so mounted and arranged that their temperatures, due to conduction of heat from the coil and along the reed, are substantially equal so to minimize any potential difference between the contacts due to thermal effects.

Further, in accordance with my invention, the fixed contacts of the vibrator are biased toward and adjustable with respect to a rigid back member to provide for stable precise adjustment, minimizing the transition time between alternate switching operations of the contacts.

For more detailed understanding of the invention and for illustration of a preferred form thereof, reference is made to the drawings, in which.

Figure 1:
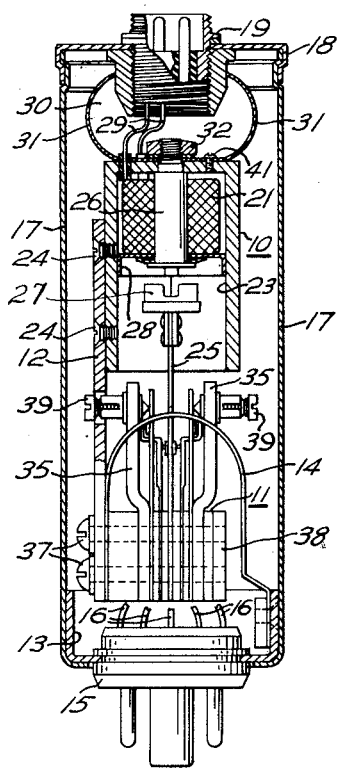
Fig. 1 is a front elevational view, partly in section, of a vibratory-reed converter.
Figure 5:
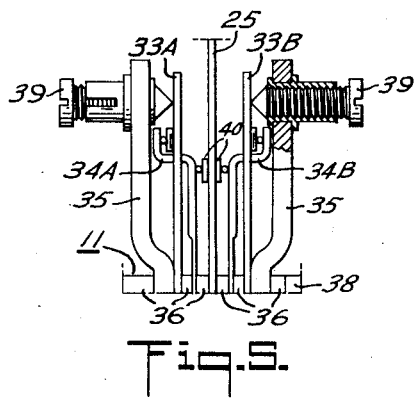
Figure 6:
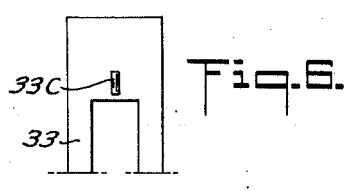
Figure 7:
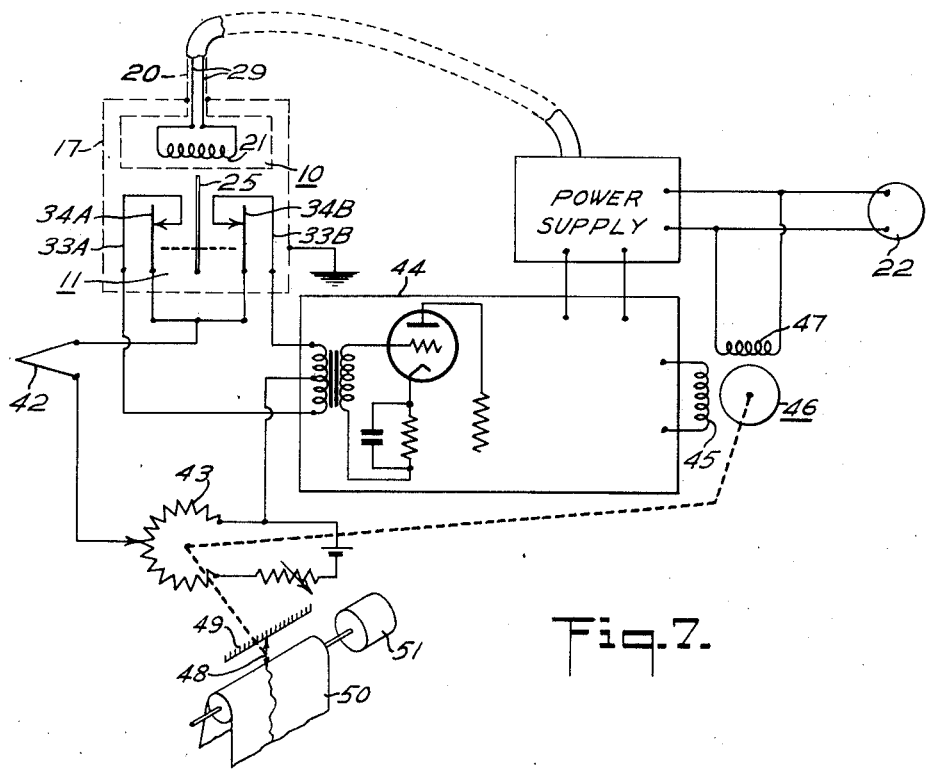
Figure 8:
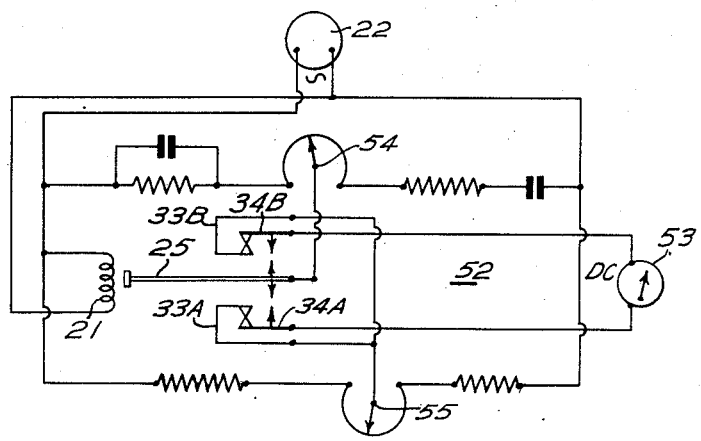

Fig. 5 on enlarged scale and with parts broken away and in section shows details of construction of the contact unit of Fig. 1;

Fig. 6 is a side elevational view of a contact member of Figs. 1 and 5;

Figs. 7 and 8 schematically illustrate measuring systems utilizing the vibrator of Fig. 1.

Figure 2:
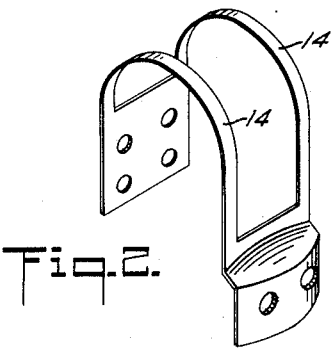
Fig. 2 is a perspective view of a shock-mount for components shown in Fig. 1.

Referring to Fig. 1, the vibrator assembly comprising the driver unit 10, the contact unit 11 and the rigid bridging strip 12 mechanically interconnecting them, is supported from the cup-shaped base member 13 by a pair of thin metal spring members 14 which, as appears from Figs. 1 and 2, are attached at their free ends to the lower end of strip 12, which cross the plane of the vibratory reed 25 intermediate the ends of the vibrator assembly and which are attached at their fixed ends to the base member 13. For convenience of installation and replacement of the vibrator, base member 13 may be provided with a terminal plug 15 from which extend the leads 16 to the various contacts of unit 11. The vibrator is encased within a metal housing 17, having at its upper end a metal cap 18 supporting a terminal socket 19 adapted to receive a plug to provide for connection of the driver coil 21 to a suitable source 22 of alternating current, such as a 60 cycle power line or transformer, Fig. 7.

Figure 3:
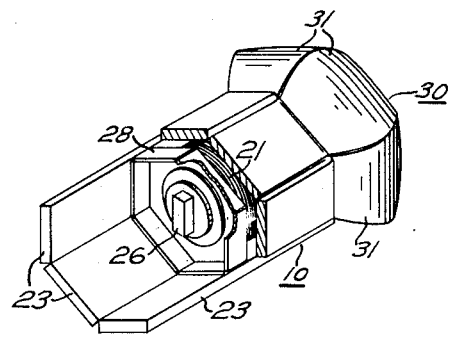
Fig. 3 is a perspective view, with parts omitted and parts broken away, of the driver unit of Fig. 1.

The driver coil 21, Figs. 1 and 3, is disposed within a tubular housing or yoke 23, of iron or suitable magnetic material, fastened as by screws 24 to the mounting strip or supporting member 12 for the driver unit. The reed 25 for actuating the contacts of unit 11 extends substantially into the coil housing 23 and, adjacent the central core member 26 of the driver coil 21, is provided with an armature member 27 which may be a permanent magnet. Preferably as shown in Fig. 1, the armature member 27 is of U-shaped cross section and is attached at the base of the U to the free end of reed 25 with the legs of the U on opposite sides of the projected axis of core 26. The ends of the armature legs are equally distant from the pole tip of core 26 and swing in an arc unobstructed by the pole tip.

The extension of the coil housing 23 substantially below the gap between the core member 26 and permanent magnet 27 confines the magnetic leakage from the gap to a region remote from the contact members of unit 11 and so minimizes or eliminates spurious output signals due to magnetic inductive effects.

Figure 4:
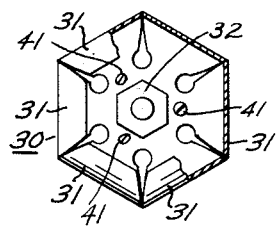
Fig. 4 is a plan view of a bonnet shield shown in Figs. 1 and 3.

The cup-shaped member 28, Figs. 1 and 3, snugly fitting the inside of coil housing 23 and extending across the lower face of the coil into contact with the core 26, cooperates with the coil housing 23 to form an electrostatic shield avoiding effect upon the contacts of unit 11 of any high frequency transients picked up by the power leads and transmitted by them to the coil 21. Member 28 is non-magnetic metal, preferably copper, and is of substantial thickness. To prevent transfer of such transients from the coil leads 29 to the contact system of the vibrator, there is provided a bonnet shield 30, Figs. 1, 3 and 4, formed by a plurality of thin metal spring members 31 held as by nut 32 and screws 41 in engagement with the upper end of the coil housing 23 and having their upper ends in contact with the metal shell of the terminal socket 19. This bonnet shield 30, the coil housing 23 and the cup 28, completely isolate the driver coil 21 and its leads 29 from the remainder of the space within the shield housing 17, so to avoid any electrostatic pickup by the contacts of unit 11 of electrical disturbances entering the vibrator unit via the power leads. The resiliency of the elements 31 of the cover on bonnet shield permits attainment of this electrical isolation without adversely affecting the freedom of movement of the vibrator assembly afforded by the shock-mounting 14 which is provided to prevent transmission of mechanical vibration to the chassis or panel on which the vibrator may be mounted in common with other equipment or devices such as amplifier tubes undesirably converting any mechanical shock into a spurious electrical response. The frictional engagement between elements 31 and the stationary shell of socket 19 provides damping limiting the amplitude of mechanical vibration of the spring-mounted assembly 10, 11 and 12.

The contact unit 11 may comprise, Fig. 5, a pair of fixed contact springs 33A, 33B, one on either side of reed 25, a pair of movable contact springs 34A, 34B, one on either side of reed 25, and a pair of rigid backing strips 35, all clamped together with interposed strips 36 of insulation by a pair of bolts 37, Fig. 1, which pass through the supporting member 12 at one side of the contact unit and threadably engage the bar or block 38 at the other side of the unit.

Any heat transmitted from the driver coil 21 to the reed 25 is conducted to the points of engagement of the contacts 33A, 33B and 34A, 34B through long paths which moveover are symmetrical with respect to the longitudinal axis of the reed. Thus, there is a substantail attenuation of the heat before its arrival at the contact points and moreover because of the symmetry of construction there is, in any event, inappreciable temperature difference between the contacts at their points of engagement. Consequently, in the operation of the vibrator there are no spurious output signals due to thermo-electric potentials.

Assuming the vibrator is adjusted or constructed to operate as a "closed" type, when the reed is in its central position shown, the both sets of vibrator contacts are closed, Fig. 5. As the reed 25 moves to the right from that position, away from alignment with the axis of the driving coil, the right-hand movable spring contact member 34B is pushed away from engagement with the rear face of the associated fixed spring contact member 33B. As the reed 25 subsequently moves to the left, the movable contact 34B returns into engagement with the fixed contact 33B, which additionally serves as a stop limiting further movement of contact 34B with the reed. The fixed contact 33B has an initial bias toward the right-hand fixed backing member 35 so that bouncing of the contact 34B on the "make" is minimized.

The other pair of vibrator contacts are of similar construction and arranged so the same sequence of operations occurs at the left-hand pair of spring contacts 33A and 34A as the reed 25 moves from its center position to and from the left extreme of its movement.

Thus, so long as coil 21 is energized the reed 25 vibrates at fixed frequency periodically to make and break electrical circuits respectively associated with the pairs of contacts 33, 34. This fixed frequency is determined by the power supply frequency energizing coil 21 and is substantially independent of the natural frequency of reed 25, which natural frequency is increased by the resilient contact with contacts 34A and 34B.

Assuming the input to the contact unit 11 is direct current, the alternate actuation of the movable contacts by the reed 25 provides, as hereinafter more fully explained, an alternating current output of substantially flat-top wave form; however, the beginning and the end of the successive half-waves or pulses may not coincide, i. e., there may be an appreciable transition time between them. This transition time or "dead" time of the vibrator may be minimized by adjusting the screws 39 so that with reed 25 in its central position its contact elements 40 are in actual engagement with or but slightly separated from the movable contact springs 34. These elements 40 may be of electrical conductive material and preferably are cylinders at right angles to cylinders on spring 34 if it is desired to use the reed 25 as a circuit element. If such use of the reed is not contemplated, the elements 40 may be of material having good heat insulation properties, so further to minimize the transfer of heat between the reed and the movable contacts 34A, 34B; in any event, the area of contact between the reed and the associated movable contacts is very small, thus insuring that most of the heat transfer between the reed and contacts is through the long thermal path extending to the base of the unit, through the insulating members 36 and thence upwardly to the pairs of contacts 33A, 34A and 33B, 34B.

The actual contact points for each pair of contact springs are preferably cylinders, of platinum or other suitable contact metal, having their axes at right angles. It will be seen that both movable contacts 34A and 34B engage reed 25 at elements 40 which is remotely located with respect to the fixed ends of the movable contacts. The free ends of contacts 34A and 34B extend outwardly away from reed 25 and beyond fixed contacts 33A and 33B with the free ends of both the movable and fixed contacts parallel to each other.

The synchronous converter described is of general application, but because of features above described for minimizing spurious signals is particularly suited for use in measuring, recording and controller systems including those of the type shown in U. S. Letters Patent 2,367,746 and in application for U. S. Letters Patent, Serial No. 725,464, now Patent No. 2,485,948, October 25, 1949. As illustrative of a system using the converter, reference is made to Fig. 7. The unbalance current produced by the difference between the voltage developed by a thermo-couple 42 and the effective voltage of a potentiometer slidewire 43 is periodically switched by the contacts of the vibrator unit to provide an alternating current signal voltage whose frequency corresponds with that of the current supplied to the driver coil 21.

This low-level signal voltage is amplified by an amplifier 44 having a suitable number of stages and whose output or power tube may be used to supply current to one winding 45 of a two phase motor 46 whose other winding 47 is energized from the same source 22 as used for energization of the driver coil 21. The phase of the current in winding 45 is determined by the sense of the difference between the thermocouple and slidewire voltages, and, therefore, when such difference exists, the motor 46, mechanically coupled to the slidewire shaft, rotates it in proper direction to restore balance of the potentiometer-thermo-couple network.

This measuring system is, therefore, of the null type and hence amplifier 44 must be sensitive to small differences of potential which are of the same order of magnitude as various disturbing effects eliminated by the construction above described.

It is important to exclude these disturbing effects to avoid operation of motor 46 in response to spurious signals which would cause unnecessary or improper adjustment of slidewire 43. Moreover, as shown in Fig. 7, the slidewire is mechanically coupled to a pointer or marker 48 associated with scale 49 and a record sheet 50 driven at constant speed as by motor 51. Unless the disturbing effects are eliminated as above described, or by equivalent means, the indicated position at a particular instant, or the variations in the record trace, may be due not to changes in thermo-couple voltage, but to spurious signals developed in the vibrator unit and arising because of transient effects picked up by the power lines, by heating effects of the driver coil 21, or by magnetic leakage in the magnetic path of the driver coil 21.

The converter may be used as a full-wave rectifier when the reed 25 is also used as a circuit element. One example of such use is shown in Fig. 8 in which the unbalance of an alternating current network 52, which may be of the type disclosed in U. S. Letters Patent 1,751,538 and 1,751,539 to Wunsch, is converted into unidirectional current of magnitude corresponding with the unbalance of the bridge and of polarity determined by the sense of the unbalance. Therefore, instead of the usual expensive alternating current galvanometer with its phase-shift circuit complications, there may be used a direct-current galvanometer 53.

As shown in Fig. 8, the vibrator is included in the galvanometer arm of the bridge 52 with the reed 25 connected to point 54, and the fixed contacts 33A, 33B connected to point 55. The direct-current galvanometer 53 is connected to the movable contacts 34A, 34B of the vibrator.

As the reed 25 vibrates in synchronism with the alternating current unbalance of the bridge, its alternate connection to movable contact spring 34A, 34B and with consequent separation between contacts 33A, 34A and 33B, 34B converts the unbalanced alternating-voltage output of the bridge into a unidirectional voltage effective to cause deflection of the direct-current galvanometer 53 in sense and to extent corresponding with the bridge unbalance. This result is obtained whether the screws 39 are adjusted so that the vibrator acts as an "open" type or as a "closed" type of converter, the difference being that when the converter is used as an "open" type, the setting of the adjusting screws 39 is such that with the reed 25 in its central position its contacts are out of engagement with those of the contact springs 34A, 34B; whereas when operated as a "closed" type of converter, the adjusting screws 39 are so set that in the central position of the reed, it is in electrical engagement with both of the contact springs 34A, 34B.

For this use of the vibrator, the above-described provision of electrostatic and electromagnetic shielding to avoid pickup by the contact system of disturbing effects conducted into or produced within the shield housing 17, and the above-described construction of the contact unit 11 to minimize thermo-electric potentials are of material benefit as otherwise these disturbances would cause spurious response of the galvanometer 53 and consequently cause false or unnecessary indications, recording or control effects.

It shall be understood the invention is not limited to the specific arrangement shown, but that changes and modifications may be made within the scope of the appended claims.

What is claimed is:

1. A synchronous converter comprising a driving coil energizable by alternating current, a vibrator reed carrying armature structure responsive to the alternating flux of said coil to effect vibration of the reed, spring contacts mechanically actuated by said reed, a tubular magnetic housing for said coil having an open-ended portion projecting beyond the coil and into which said reed substantially extends for confinement of the magnetic leakage of said coil to a region remote from said contacts, and a shield member within said housing and cooperating therewith electrostatically to isolate said contacts from said coil in avoidance of pickup by the contacts of electrical transients in the coil.

2. A synchronous converter suited for use in measuring systems comprising a driving coil energizable by alternating current, a reed having armature structure actuated by said coil for effecting motion away from alignment with the axis of said driving coil resulting in synchronous vibration of the reed, contact structure actuated by said reed, and electrostatic and magnetic shielding for isolating said contacts comprising a magnetic-metallic housing surrounding said coil extending therefrom to surround said armature structure providing magnetic actuation of said reed and conductive shielding extending therefrom to encase the leads to said coil whereby spurious signals due to electrostatic and electromagnetic effects of the alternating electric field of said driving coil upon said contacts are substantially eliminated.

3. A synchronous converter comprising a driving coil energizable by alternating current, a reed having armature structure actuated by said coil for vibration of the reed in synchronism with said current, contacts actuated by said reed, and electrostatic shielding for isolating said contacts comprising a magnetic shell enclosing said coil, a non-magnetic conductive shield member within said shell and interposed between said coil and the reed and a non-magnetic conductive shield member extending from said housing to encase the leads supplying said current to said coil.

4. A full wave synchronous rectifier comprising a driving coil energizable from alternating current, a single vibratory reed having armature structure actuated by said coil to effect synchronous vibration of the reed, and two pairs of normally-closed spring contacts one of said pairs being on one side of said reed and the other of said pairs being on the opposite side of said reed, the movable contact of each pair having a portion disposed between the corresponding fixed contact and said reed for engagement by said reed and a portion disposed on the opposite side of the fixed contact for engagement therewith, said reed alternately electrically engaging the movable contact of each of said pairs to break a circuit from a contact of that pair to the other contact thereof and to make a circuit from the reed to the movable contact of that pair, thereby to increase the natural resonance frequency of the vibrating reed to stabilize synchronous operation thereof.

5. A synchronous converter comprising a driving coil unit, a contact unit including a vibratory reed having armature structure actuated by said coil, a bridging member connecting said units to form an assembly, a pair of flexible metallic spring members fastened at one end to a fixed support and at the other end to said contact unit to permit vibration of said assembly as a whole, and flexible metallic members extending from said driving coil unit frictionally to engage a fixed member to provide for damping of the vibration of said assembly and forming an electrostatic shield for the leads to said coil.

6. A vibratory convertor comprising a driving coil, a vibratory reed having its free end adjacent said coil, a pair of contact-carrying spring members disposed on each side of said reed, one member of each pair engageable by the reed at a point remote from the member's fixed end, said member beyond its point of engagement with the reed extending outwardly away from the reed and beyond the other member of the pair with its free end extending parallel to the free end of said other member, and cooperating contacts carried by the free ends of each pair of members, said reed periodically engaging said one member of each pair to effect separation of said cooperating contacts of the pair and thereby increasing the natural resonance frequency of said reed.

7. A vibratory converter comprising a mounting strip, a driving coil attached to one end of said strip, a contact unit attached to the other end of said strip and including a vibratory reed having its free end adjacent said coil, said strip and said units forming an assembly, and spring means for resiliently supporting said assembly comprising a pair of spring members having U-shaped flexing portions and attached at their free ends to one end of said strip, crossing the plane of the reed on a line intermediate the ends of said assembly to form two resilient side portions, one extending across one side of the contact structure and the other across the other side of the contact structure, and extending to a stationary support to which the fixed ends are attached, and damped resilient restraining means supporting the other end of said assembly.

8. A vibratory converter suited for use in measuring systems comprising a driving coil energizable by alternating current, a core therefor having projecting pole tip structure, a vibratory reed, a U-shaped permanent-magnet armature attached at its base to the free end of the reed with its oppositely poled ends symmetrically spaced from and movable in an arc clear of said pole tip structure, contacts alternately actuated by the reed as the armature is magnetically pulled alternately in opposite directions during energization of the coil, and a tubular magnetic housing for said coil having an extension into which the free end of the reed extends to confine the magnetic leakage flux to a region remote from said contacts whereby spurious signals due to magnetic inductive effects of the alternating magnetic field of said driving coil upon said contacts are substantially eliminated.

9. A vibratory converter comprising a driving coil, a core therefor having a pole tip extending axially from the coil, a tubular housing of magnetic material encasing said coil and extending substantially beyond said pole tip, a vibratory reed having its free end extending into said housing along the projected axis of said coil, a U-shaped permanent-magnet armature attached at its base to the free end of said reed with its oppositely-poled legs extending toward said coil and terminating short of said pole tip on opposite sides of said axis, and contacts disposed externally of said housing alternately actuated by the reed as said armature is magnetically pulled alternately in opposite directions by said coil.

10. A synchronous converter for use in measuring systems comprising a driving coil unit energizable by alternating current, a contact unit including a vibratory reed having armature structure actuated by said coil, a bridging member connecting said units to form an assembly having said driving coil unit and its leads at one end and said contact unit and its leads at the opposite end, electrostatic shielding for isolating said contacts from the alternating field of said coil including conductive shielding extending from said first-named end of the assembly to encase the coil leads, and means for resiliently supporting said assembly comprising a pair of U-shaped spring members attached at their free ends to one end of said bridging strip, crossing the plane of the reed intermediate the ends of said assembly and extending to a stationary support to which the fixed ends of said spring members are attached.

11. A synchronous converter suited for use in a measuring system comprising a driving coil energizable by alternating current, a reed having armature structure actuated by said coil for effecting synchronous vibration of the reed, contact structure actuated by said reed, a magnetic-metallic yoke surrounding said driving coil to contain the magnetic field of said driving coil, and a metallic cover complementary to said magnetic-metallic yoke to enclose said driving coil and to complete the electrostatic shielding of said driving coil, said electrostatic shielding extending to encase the leads to said coil, whereby spurious signals due to the effects of the fields of said driving coil upon said contacts are substantially eliminated.

12. In a vibratory converter suited for use in measuring systems, wherein a low-level signal difficult of direct amplification is changed to a readily amplifiable alternating signal by contacts actuated by a vibrating reed and a driving coil, means for preventing the transfer of error-producing energy from the driving coil to the low-level circuits comprising a magnetic-metallic yoke surrounding said driving coil, and a metallic cover complementary to said magnetic-metallic yoke to form a complete electrostatic shielding of said driving coil, said electrostatic shielding including means extending to encase the leads to said coil, whereby spurious signals due to effects of the alternating electric field of said driving coil upon said contacts are substantially eliminated.

13. In a vibratory converter suited for use in a measuring system, wherein a low-level signal difficult of direct amplification is changed to a readily amplifiable alternating signal by contacts actuated by a vibrating reed and a driving coil, means for preventing the transfer of error-producing energy from the driving coil to the low-level measuring circuits comprising a conductive yoke surrounding said driving coil, a conductive cover complementary to said yoke to complete the electrostatic shielding of said driving coil, and conductive shielding extending said electrostatic shielding to encase the leads to said coil, whereby spurious signals due to electrostatic effects of the alternating electric field of said driving coil upon said contacts are substantially eliminated.

ALBERT J. WILLIAMS, JR.
RAYMOND E. TARPLEY.

REFERENCES CITED

The following references are of record in the file of this patent:

UNITED STATES PATENTS

| Number | Name | Date |
| --- | --- | --- |
| 79,330 | Durant | June 30, 1868 |
| 749,814 | Downs | Jan. 19, 1904 |
| 769,572 | Stewart, Jr. | Sept. 6, 1904 |
| 822,968 | Manson | June 12, 1906 |
| 1,209,281 | Gardner | Dec. 19, 1916 |
| 1,510,341 | Proctor | Sept. 30, 1924 |
| 2,102,409 | Faus | Dec. 14, 1937 |
| 2,243,920 | Philips | June 3, 1941 |
| 2,264,124 | Schreiner | Nov. 25, 1941 |
| 2,313,919 | Burt | Mar. 16, 1943 |
| 2,339,973 | Aust | Jan. 25, 1944 |
| 2,391,668 | Austin | Dec. 25, 1945 |
| 2,396,332 | McBerty | Mar. 12, 1946 |
| 2,416,736 | Buckley | Mar. 4, 1947 |
| 2,423,524 | Side | July 8, 1947 |
| 2,455,253 | Huetten | Nov. 30, 1948 |